Figure 1:
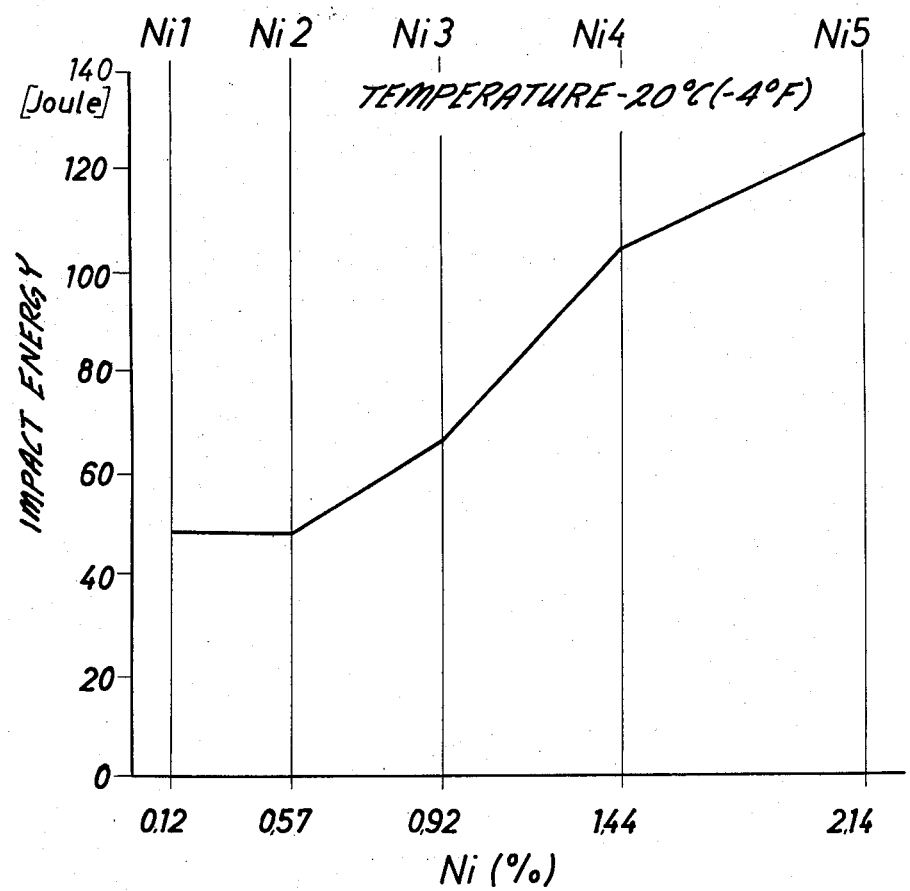

United States Patent [19]
Düren

[11] 4,292,492
[45] Sep. 29, 1981

[54] SEAM WELDING OF PIPES

[75] Inventor: Karl Düren, Duisburg, Fed. Rep. of Germany

[73] Assignee: Mannesmann AG, Dusseldorf, Fed. Rep. of Germany

[21] Appl. No.: 794,418

[22] Filed: May 6, 1977

[30] Foreign Application Priority Data

May 11, 1976 [DE] Fed. Rep. of Germany ....... 2621182

[51] Int. Cl.³ .............................................. B23K 9/18
[52] U.S. Cl. ...................................... 219/73; 219/61; 219/146.1; 219/146.41
[58] Field of Search .................. 219/73 R, 145, 146.1, 219/146.41, 61, 59.1, 60 R; 75/123 K

[56] References Cited

U.S. PATENT DOCUMENTS

| 1,905,247 | 4/1933 | Scott | 75/123 K |
| 3,424,892 | 1/1969 | Wilcox | 219/146.23 X |
| 3,602,689 | 8/1971 | Heuschkel | 219/146.1 X |
| 3,745,294 | 7/1973 | Arikawa | 219/146.41 X |
| 3,811,873 | 5/1974 | DeBarbadillo | 75/123 K |
| 3,859,495 | 1/1975 | Takahashi et al. | 219/60 R |
| 3,867,608 | 2/1975 | Ohwa | 219/73 R |
| 3,970,447 | 7/1976 | Lang | 75/123 K |

FOREIGN PATENT DOCUMENTS

| 42-11136 | 3/1967 | Japan | 75/123 K |
| 46-16252 | 4/1971 | Japan | 75/123 K |
| 47-3002 | 1/1972 | Japan | 219/146.23 |
| 305975 | 7/1971 | U.S.S.R. | 219/146.23 |

Primary Examiner—Richard R. Kucia
Attorney, Agent, or Firm—Smyth, Pavitt, Siegemund & Martella

[57] ABSTRACT

Pipes are submerged - arc seam welded with a welding wire having a relatively high nickel content (about 6%), and low carbon content (<0.08%) to obtain a seam having a ductility and toughness which is still adequate for very low temperatures.

2 Claims, 2 Drawing Figures

SEAM WELDING OF PIPES

BACKGROUND OF THE INVENTION

The present invention relates to welding seams of and in longitudinally, seam, welded tubes or pipes of large diameter and having wall thicknesses from about 10 to about 40 millimeter. More particularly, the invention relates to welding seams of microalloy steel containing niobium and/or vanadium.

As a consequence of the increasing energy consumption, the construction of pipelines for the transport of gas and oil has accelerated in recent years. It is usually desired to use pipes of large diameter in order to permit a throughput that is as large as possible. Also, the thickness of the pipe increases because of high pressure of the medium to be transported. Of particular interest here is pipe material made of a very strong microalloy steel. The pipes made from such a steel are usually submerged arc welded to obtain a longitudinal welding seam, and the seams are welded in position and counter position, i.e., with a backing member. The welding seams have, as a particular feature, a cast-like solidification texture with well-developed primary crystallization. Such pipes are, for example, used in arctic zones and the strengths and ductility of such a seam under such conditions becomes of particular importance. The conditions for welding are rather unfavorable in the beginning because of the stratification of the material to be welded; moreover an additional problem exists in that the welding seam is comprised of about ⅔ of molten pipe material and about ⅓ of molten welding wire or rod. The metallurgy of the resulting welding seam is also influenced by the powder for the submerged arc welding process.

SUMMARY DESCRIPTION OF THE INVENTION

It is an object of the present invention to provide a welding seam for pipes made of micro-alloyed steel and to provide, also, the necessary welding wire to obtain good ductility of the seam even at temperatures as low as $-60°$ C.

It is another object of the present invention to provide a new and improved method for longitudinally submerged arc welding of pipes made of steel, having up to 0.1% carbon, up to 2% manganese, up to 0.35% molybdenum, and up to 0.5% nickel.

In accordance with the present invention, it is suggested to provide a welding seam with the following consistency (all percentages by weight):
up to 0.1% C
up to 0.4% Si
up to 1.8% Mn
up to 0.5% Mo
1.5 to 2.5% Ni
up to 0.015% P and S
up to 0.03% $O_2$
the remainder being iron as well as some Niobium and/or Vanadium from the pipe material.

It was found that a particularly advantageous embodiment of the invention is to be seen in a welding seam composed as follows:
up to 0.05% C
up to 0.3% Si
up to 1.2% Mn
0.2 to 0.4% Mo
not more than 0.015% P and/or S
the remainder being Fe and some Nb and/or V.

In order to provide the welding seam of the nature as described, a welding wire should be used having the following consistency:
up to 0.1% C
up to 0.4% Si
up to 1.5% Mn
up to 0.6% Mo
4.5 to 7.5% Ni
up to 0.015% P and 'S
the remainder being Fe.

It was found that a particularly advantageous welding wire is to be composed in accordance with the following ranges:
0.02 to 0.08% C
0.15 to 0.25% Si
0.4 to 0.6% Mn
0.02 to 0.4% Mo
5.5 to 6.5% Ni
the remainder being Fe.

DESCRIPTION OF THE DRAWINGS AND OF THE PREFERRED EMBODIMENT

Figure 2:
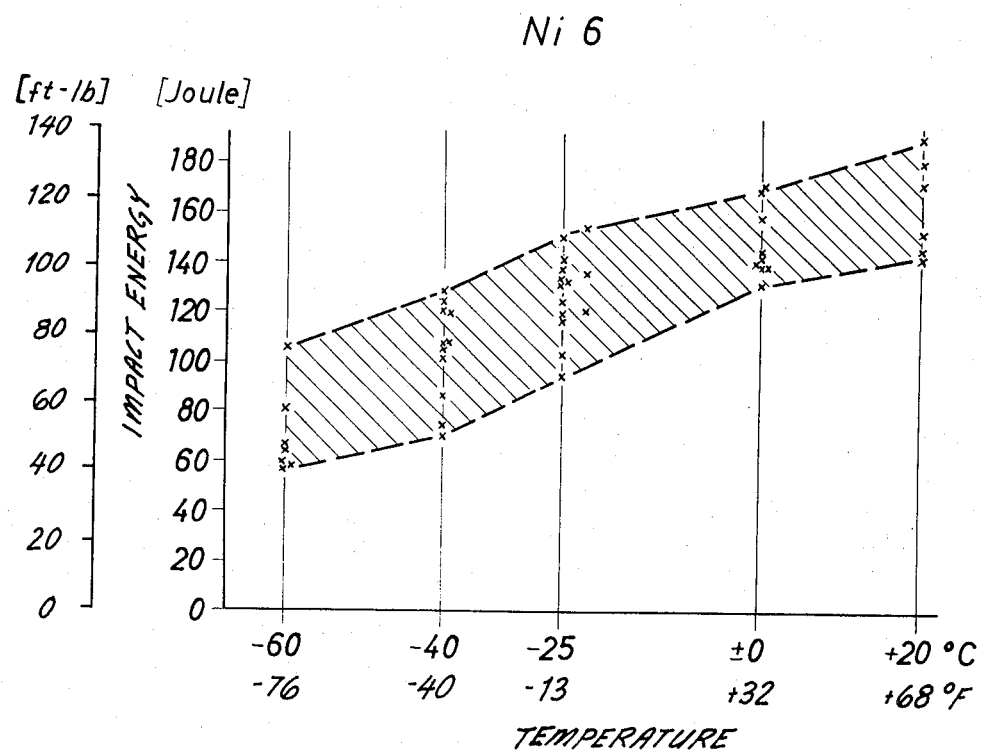

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a graph in which impact notch work is plotted against nickel content; and FIG. 2 is a graph in which notch impact work is plotted against temperature of use.

Proceeding now to the detailed description of a preferred embodiment, a particular sheet metal steel was made by thermal mechanical rolling of a final thickness of 17 mm and consisting of micro-alloyed Mn/Nb/V steel having particularly the following consistency:
0.07% C
0.29% Si
1.35% Mn
0.018% P
0.007% S
0.029% Al (solved)
0.035% Nb
0.06% V These sheets were welded in the laboratory whereby particularly different welding wires were used. In the table below, the two wires designated C2 and C3 available in in commerce; W2 is a test wire and W3 is a welding wire in accordance with the invention. Both W2 and W3 have a lower carbon and a higher nickel content. The wires used had the following chemical consistency (in addition to iron in each instance):

| Wire | C % | Si % | Mn % | P % | S % | Ni % | Mo % |
|---|---|---|---|---|---|---|---|
| C2 | 0.10 | 0.19 | 1.04 | 0.009 | 0.014 | 0.05 | 0.52 |
| C3 | 0.09 | 0.09 | 1.00 | 0.008 | 0.013 | 0.97 | 0.47 |
| W2 | 0.02 | 0.29 | 1.17 | 0.014 | 0.010 | 2.50 | 0.01 |
| W3 | 0.02 | 0.18 | 0.55 | 0.008 | 0.010 | 6.05 | 0.60 |

The welding was particularly conducted in submerged arc welding procedure using a basic powder having Bonischewski basicity of approximately 4.

Next, it was attempted to provide welding seams in which the nickel content is varied. This was particularly obtained by combining wires of the type referred to above in a so-called three wire weld:

| C % | Si % | Mn % | P % | S % | Mo % | Ni % | Nb % | $O_2$ % |
|---|---|---|---|---|---|---|---|---|
| 0.05 | 0.21 | 1.10 | 0.012 | 0.009 | 0.42 | 2.20 | 0.020 | 0.020/0.030 |

| seam | type of wire 1 | 2 | 3 | C % | Si % | Mn % | P % | S % | Ni % | Mo % | Nb % | V % | $O_2$ % |
|---|---|---|---|---|---|---|---|---|---|---|---|---|---|
| Ni 1 | C 2 | C 2 | C 2 | 0.08 | 0.25 | 1.23 | 0.012 | 0.008 | 0.12 | 0.21 | 0.020 | 0.02 | 0.020/0.030 |
| Ni 2 | C 3 | C 3 | C 3 | 0.08 | 0.24 | 1.21 | 0.011 | 0.009 | 0.57 | 0.19 | 0.015 | 0.02 | " |
| Ni 3 | W 2 | W 2 | W 2 | 0.07 | 0.23 | 1.23 | 0.010 | 0.008 | 0.92 | 0.02 | 0.020 | 0.03 | " |
| Ni 4 | C 2 | W 2 | W 3 | 0.07 | 0.25 | 1.15 | 0.012 | 0.008 | 1.44 | 0.16 | 0.020 | 0.04 | " |
| Ni 5 | W 3 | W 3 | W 3 | 0.05 | 0.26 | 1.24 | 0.014 | 0.007 | 2.14 | 0.21 | 0.025 | 0.04 | " |

As a consequence, one did obtain a nickel content that varied in the different seams from 0.12% to 2.14%. This significant variation gave rise to designating the seams by nickel numbers as per the left hand margin in the table above. The molybdenum content varied from 0.16% to 0.21%, except that the Ni-3 seam is almost free of molybdenum. All of the welding seams contained from 0.020 to 0.030% oxygen ($O_2$). In order to counteract the strength-enhancing effect of nickel and at an average content or Mn of about 1.2%, the carbon content was lowered from about 0.08% at the lowest nickel content (Ni 1-wire) to about 0.05% at the highest nickel content (Ni-5 wire). As a consequence, these seams differ hardly at all as far as strength is concerned and they reach with certainty a strength level of X70, that is, a yield point of 49 kiloponds per square millimeter.

The mechnical technological investigations did not only extend to measuring hardness and tear strength, but included also notched bar impact bending tests. The toughness and ductility of the welding seam was determined in Charpy-V-notch specimens in dependance upon temperature. The specimens were notched in the center of the seam and vertically to the seam surface. FIG. 1 shows the impact notch work at a temperature of −20° C. for various nickel contents. One can readily see that for nickel contents above about 1%, the impact notch work increased. The impact notch work is quite high for nickel contents of about 2%.

Next, pipes were welded having 48″ diameter and 20.3 mm wall thickness and particularly consisting of a micro-alloyed Mn/Mo/Nb steel having, in addition to iron, the following chemical consistency:

| C % | Si % | Mn % | P % | S % | $Al_{solved}$ % | Mo % | Nb % |
|---|---|---|---|---|---|---|---|
| 0.06 | 0.26 | 1.51 | 0.006 | 0.007 | 0.023 | 0.31 | 0.038 |

After preliminary tackwelding the split pipe, the joint of the split pipe was submerged-arc welded using three wires of the W3 type having a very low carbon content and being of the Nickel Molybdenum alloy type. Also, a basic powder was used for the welding. After the welding seam was completed the seam had the following chemical consistency (in addition to Fe):

It can readily be seen that this particular seam has, as is desired, a relatively low carbon content, being as low as 0.05%, while the nickel content is in excess of 2%, namely 2.2%. The higher Mo content of about 0.42% results from a mixture of the wire material with the pipe material but is not necessary in accordance with the prior investigations, but this Mo content did not provide any detriment. In view of the fact that a basic powder was used, the seam has a very low $O_2$ content ranging from about 0.02 to about 0.03%. In addition, it should be mentioned that the very low P and S contents are a very desired feature.

The impact notch work in accordance with the Charpy-V-notch samples with a notch in the top of the seam, perpendicularly to the surface of the pipe was determined. A band of measuring values was obtained which is depicted in FIG. 2. The measuring values vary in accordance with temperature. This Figure demonstrates excellent ductility and toughness even at very low temperatures; it was found that the resulting grain texture of the seam was quite favorable for withstanding low temperatures. The relatively high nickel content changed the conversion characteristics and behavior of the weld material in such a manner that the ferrite formation could be shifted to longer periods. Accordingly, a uniform fine grain bainitic texture was obtained considering that the characteristic cooling speeds $t_{8/5}$ is approximately 50 seconds.

I claim:

1. In a method of longitudinally, submerged-arc, seam welding pipes made of pipe steel having up to 0.1% carbon, 2% manganese, 0.35% molybdenum and up to 0.5% nickel, using at least one welding wire having the following consistency:
up to 0.1% C
up to 0.4% Si
up to 1.5% Mn
up to 0.6% Mo
4.5 to 7.5 N:
up to 0.015% P and S
the remainder being Fe.

2. The Method as in claim 1, using a welding wire having the following consistency:
0.02 to 0.08% C
0.15 to 0.25% Si
0.4 to 0.6% Mn
0.02 to 0.4% Mo
5.5 to 6.5% Ni
the remainder being Fe.

* * * * *